United States Patent Office 3,163,669
Patented Dec. 29, 1964

3,163,669
UNSATURATED CARBOXYLIC ACID ESTERS CONTAINING PHOSPHORUS
Walter Stilz and Horst Pommer, both of Ludwigshafen (Rhine), Germany, assignors to Badische Anilin- & Soda-Fabrik Aktiengesellschaft, Ludwigshafen (Rhine), Germany
No Drawing. Filed June 19, 1961, Ser. No. 117,810
Claims priority, application Germany, Oct. 17, 1958, B 50,760
7 Claims. (Cl. 260—461)

This invention relates to novel and useful unsaturated carboxylic acid esters containing phosphorus, more particularly to compounds containing at least one C—C double linkage, a carboxylic acid ester group and a phosphonic acid ester group or a phosphinic acid ester group.

The novel compounds are represented by the general formula:

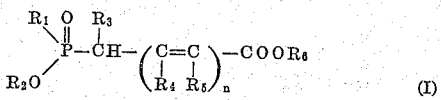

in which $R_1$ represents alkyl or aryl, alkoxy, cycloalkoxy, aralkoxy or aryloxy, $R_2$ and $R_6$ represent alkyl, cycloalkyl, aralkyl or aryl, $R_3$, $R_4$ and $R_5$ have the same meanings as $R_2$ and $R_6$ but may also stand for hydrogen, and $n$ is an integer from 1 to 4 inclusive.

In the preferred compounds of the general Formula I, $R_1$ represents phenyl or naphthyl which may be substituted by 1 to 2 alkyls with 1 to 4 carbon atoms, by 1 to 2 halogen or by 1 to 2 alkoxy with 1 to 4 carbon atoms and further represents alkyl with 1 to 4 carbon atoms or alkoxy with 1 to 4 carbon atoms. In said compounds $R_2$ represents alkyl with from 1 to 4 carbon atoms, $R_6$ represents alkyl with from 1 to 10 carbon atoms, especially 1 to 4 carbon atoms, and $R_3$, $R_4$ and $R_5$ represent alkyl with 1 to 4 carbon atoms, especially methyl or hydrogen. $n$ preferably is an integer of from 1 to 3 inclusive.

Preferred classes of compounds which fall within the scope of the general Formula I are, for example, represented by the general formulae:

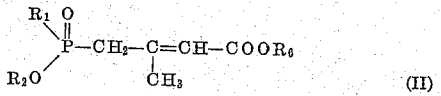

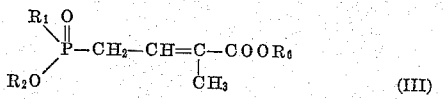

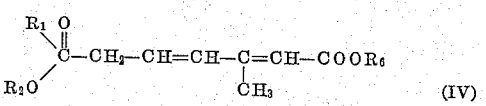

and

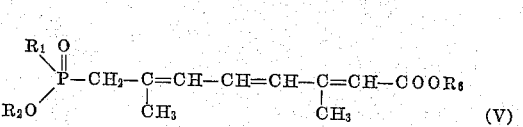

In these formulae, $R_1$, $R_2$ and $R_6$ have the meanings given above, $R_1$ representing in particular phenyl, alkyl with 1 to 4 carbon atoms, and especially alkoxy with 1 to 4 carbon atoms.

The compounds of the general Formula I include the following: 1 - carbethoxy - 2 - methyl - propene - (1) - diethyl - phosphonate - (3), 1 - carbethoxy - 2 - methylpentadiene - (1,3) - diethyl - phosphonate - (5), 1 - carbethoxy - 2,6 - dimethyl - heptatriene - (1,3,5) - diethylphosphonate - (7), 1 - carbobutoxy - 2 - butyl - propene- (1) - diethyl - phosphonate - (3), 1 - carbomethoxy - 3 - methyl - pentadiene - (1,3) -diethyl - phosphonate - (5), 1 - carbomethoxy - 1 - methyl - propene - (1) - diethyl- phosphonate - (3), 1 - carboethoxy - 2 - methyl - propene- (1) - dibutyl - phosphonate - (3), 1 - carbethoxy - 2- methyl - propene - (1) - phenylphosphinic acid - (3) ethyl ester, 1 - carbethoxy - 1 - methyl - propene - (1)- p - butoxy - phenylphosphinic acid - (3) butyl ester, 1- carbobutoxy - 2 - methyl - pentadiene - (1,3) - p - methoxy - phenyl - phosphinic acid - (5) methyl ester, 1 - carbomethoxy - 2 - methyl - propene - (1) - p - isopropylphenylphosphinic acid - (3) methyl ester, 1 - carbomethoxy - 2,6 - dimethyl - heptatriene - (1,3,5) - n - butylphosphinic acid - (7) methyl ester, 1 - carbooctoxy - propene - (1) - methyl - phosphinic acid - (3) methyl ester, 1 - carbomethoxy - 1 - methyl - propene - (1) - p - chlorphenylphosphinic acid - (3) ethyl ester, 1 - carbomethoxypropene - (1) - α(β - methoxy) - naphthyl - phosphinic acid - (3) methyl ester and 1 - carbomethoxy - 2 - methylpropene - (1) - 2',4' - dichlorphenylphosphinic acid - (3) ethyl ester.

The novel compounds (I) are obtained in a simple and efficient way by reacting an unsaturated carboxylic acid ester (VI) with a phosphorous acid ester or a phosphonic acid ester (VII) according to the equation:

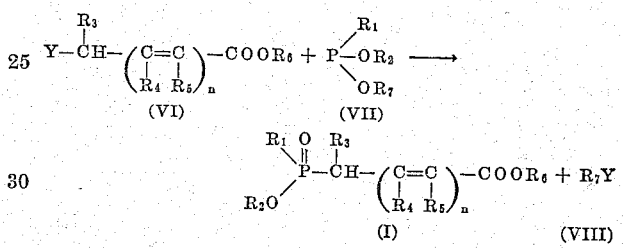

In the Formulae I, VI, VII and VIII, $R_1$, $R_2$, $R_3$, $R_4$, $R_5$, $R_6$ and $n$ have the meanings given above, Y represents a halogen or the O-tosyl radical,

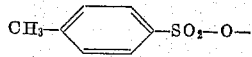

and $R_7$ has the same meaning as $R_2$.

Generally speaking the process for making the new compounds in accordance with our invention comprises mixing and heating compounds (VI) and (VII), advantageously in about stoichiometric amounts. According to a preferred technique one of the compounds is heated to reaction temperature which ranges between about 40° and 280° C. The preferred temperature lies between 100° and 200° C. To this first compound having thus been preheated the second compound is then added by portions. It is advisable to remove compound (VIII) by distillation as formed. Toward the end of the reaction the temperature may be raised to the upper limits of the said temperature ranges. Low-boiling by-products may also be removed from the reaction mixture at reduced pressure. In many cases the crude unsaturated carboxylic acid ester (I) can be directly used for further reactions. However, it may also be purified by distillation in vacuo before being further processed.

The novel compounds are useful intermediates for the synthesis of substances containing conjugated double linkages. If the novel compounds according to this invention are reacted with a carbonyl compound which contains several double linkages in conjugation with each other and with the carbonyl double bond, the double linkage system is extended by 2 to 5 conjugated double linkages. This is especially advantageous in the production of compounds of the vitamin A series which are inter alia applicable as food dyes. Thus, for example, 1-carbomethoxy-3-methyl-pentadiene-(1,3)-diethyl-phosphonate-(5) or 1-carbomethoxy - 3 - methylpentadiene - (1,3)-ethyl-tolylphosphinate yields methyl-bixin by reaction with 2,7-dimethyloctatriene-(2,4,6)-dial-(1,8). Crocetin dimethyl ester is obtained by reacting 1-carbomethoxy-1-methyl-propene-(1)-diethyl-phosphonate-(3) with the same dialdehyde. Furthermore, vitamin A acid ethyl ester is produced by reacting 1-carboethoxy - 2 - methyl-propene-(1)-diethyl-phosphonate-(3) or 1-carboethoxy-2-methyl-propene-(1)-ethyl-phenylphosphinate-(3) with beta-ionylidene-acetaldehyde. Another example for the use of the novel compounds is the reaction of acetaldehyde with 1-carbomethoxy-propene-(1)-diethyl-phosphonate-(3) or 1-carbomethoxy-propene-(1)-ethyl-phenylphosphinate-(3) to produce sorbic acid methyl ester. This ester can be saponified in known manner, e.g., by heating with diluted mineral acids. Sorbic acid is a well-known agent for preserving food.

The following examples will further illustrate this invention but the invention is not restricted thereto. The parts are by weight unless otherwise specified; the parts by weight bear the same relation to the parts by volume as the gram to the cubic centimeter under standard conditions.

*Example 1*

84 parts of gamma-bromo-beta-methylcrotonic acid ethyl ester are gradually added to 100 parts of triethyl phosphite heated to 100° C. The ethyl bromide formed is distilled off in a packed tower. The internal temperature is gradually raised to 180° C. and the mixture then distilled under reduced pressure, 97 parts of 1-carbethoxy-2 - methyl-propene-(1)-diethyl-phosphonate-(3) passing over as a colorless oily liquid at a temperature of 104° to 105° C. and a pressure of 0.1 mm. Hg.

*Example 2*

126 parts of omega-bromo-beta-methyl-sorbic acid ethyl ester are cautiously heated with 120 parts of triethyl phosphite. At an internal temperature of 100° to 110° C., a vigorous reaction sets in. The internal temperature is kept at the said level by strong cooling and raised to 180° C. when the reaction subsides. The reaction mixture is then distilled under reduced pressure, 120 parts of 1-carbethoxy - 2 - methyl-pentadiene-1,3)-diethyl-phosphonate-(5) passing over as a viscous colorless oil at a temperature of 130° to 132° C. and a pressure of 0.01 mm. Hg.

*Example 3*

A solution of 108 parts of 2,6-dimethyl-7-bromheptatriene-(1,3,5)-carboxylic acid ethyl ester-(1) in 40 parts of triethyl phosphite is dripped into 40 parts of triethyl phosphite heated to 140° C. The ethyl bromide formed during reaction is distilled off in a packed tower. When the reaction has come to an end, the mixture is fractionated in a high vacuum, 100 parts of 1-carbethoxy-2,6-dimethyl-heptatriene-(1,3,5)-diethyl-phosphonate-(7) passing over as a viscous yellowish oil at a temperature of 145° to 147° C. and a pressure of 0.02 mm. Hg.

*Example 4*

96 parts of gamma-bromotiglic acid methyl ester are added to 91 parts of triethyl phosphite at 140° to 150° C. by portions and the ethylbromide formed is distilled off in a packed tower. The mixture is then heated to 180° to 190° C. for an hour and distilled at reduced pressure, 95 parts of 1-carbomethoxy-1-methylpropene-(1)-diethyl-phosphonate-(3) passing over as a pale yellow oily liquid at a temperature of 115° to 117° C. and a pressure of 0.1 mm. Hg.

*Example 5*

84 parts of gamma-bromo-beta-methylcrotonic acid ethyl ester are added to 90 parts of phenylphosphonous acid diethyl ester, heated to 130° C., by portions and the ethylbromide formed is distilled off in a packed tower. The reaction mixture is then heated to 180° C. and any lower-boiling fractions are extracted at reduced pressure. There are obtained 104 parts of crude 1-carbethoxy-2-methyl-propene-(1)-ethyl phenylphosphinate-(3) as a yellow viscous oil.

62 parts of the crude phosphinate and 44 parts of beta-ionylidene acetaldehyde are dissolved in 150 parts by volume of dimethylformamide and to this solution 50 parts of a 30% solution of sodium ethylate in ethanol are added under nitrogen at room temperature. When all of the alkali has been added, the reaction mixture is stirred for an hour, then combined with an equal amount of water, neutralized to pH 7 with glacial acetic acid and extracted with petroleum ether. The solution in petroleum ether is washed, dried and concentrated by evaporation and the residue is recrystallized from ethanol under nitrogen. There are obtained 41 parts of vitamin A acid ethyl ester with the melting point 49° to 50° C. This ester can be reduced to vitamin A by the method of O. Isler and M. Montavon (Chimia 12, 3 (1958)).

*Example 6*

193 parts of gamma-bromotiglic acid methyl ester are added to 150 parts of methylphosphonous acid diethyl ester at 100° to 110° C. by portions and the ethylbromide is distilled off in a packed tower. The mixture is then heated to 150° to 160° C. for 30 minutes and any low-boiling fractions are withdrawn at reduced pressure. There are obtained 137 parts of crude 1-carbomethoxy-1-methyl-propene-(1) ethyl methylphosphinate-(3) as a yellowish oil.

40 parts of the phosphinate obtained by the method described in the foregoing paragraph and 16.4 parts of 2,7-dimethyloctatriene-(2,4,6)-dial-(1,8) are dissolved in 200 parts by volume of dimethylformamide and to this solution 40 parts of a 30% solution of sodium methylate in methanol is added at 0° to 5° C. with intense agitation. From the dark-brown mixture crystals separate after a few minutes. The mixture is stirred for 30 minutes, neutralized with glacial acetic acid to pH 7 and then combined with 150 parts of methanol. The precipitate is filtered off by suction and recrystallized from ethyl acetate, 19.2 parts of crocetin dimethyl ester being obtained as red rhombic leaflets having the melting point 223° to 225° C.

*Example 7*

In this example the compound obtained in Example 4 is reacted with 2,7-dimethyloctatriene-(2,4,6)-dial-(1,8) to crocetin dimethyl ester (methyl crocetin).

To a solution of 53 parts of 1-carbomethoxy-1-methyl-propene-(1)-diethyl-phosphonate-(3) and 16.4 parts of 2,7-dimethyl-octatriene-(2,4,6)-dial-(1-8) in 200 parts by volume of dimethyl formamide 40 parts of a 30% solution of sodium methylate in methanol are added at 0° to 50° C. while stirring, the mixture assuming a dark-brown coloration. After a few minutes crystals separate. The mixture is stirred for one hour, neutralized to pH 7 with glacial acetic acid and then combined with 150 parts by volume of methanol. The precipitate is filtered off by suction and recrystallized from ethyl acetate, 20.4 parts of crocetin dimethyl ester being obtained as red rhombic leaflets having the melting point 224° to 226° C.

*Example 8*

In this example the compound of Example 2 is reacted with beta-ionone to produce vitamin A acid ethyl ester.

To a mixture of 38 parts of beta-ionone, 60 parts of 1-carbethoxy-2-methyl-pentadiene-(1,3) - diethyl-phosphonate-(5) and 150 parts by volume of dimethyl formamide, 45 parts of a 30% solution of sodium ethylate are added at room temperature under nitrogen. When all of the alkali has been added the mixture is stirred for three hours, then combined with an equal amount of water, neutralized to pH 7 with glacial acetic acid and extracted with ether. The ethereal solution is washed, dried and concentrated by evaporation and the residue is rapidly distilled in a high vacuum under nitrogen, 32 parts of vitamin A acid ethyl ester being obtained as a viscous yellow oil at a temperature of 178° to 180° C. and a pressure of 0.2 mm. Hg.

Vitamin A acid ethyl ester can be reduced to vitamin A by the method of O. Isler and M. Montavon, Chimia 13, 3 (1958).

This application is a continuation-in-part of our copending application Serial No. 846,823, filed October 16, 1959, now abandoned.

What we claim is:
1. A compound of the formula:

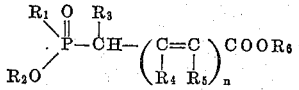

wherein $R_1$ represents a member of the group consisting of alkyl with 1 to 4 carbon atoms, alkoxy with 1 to 4 carbon atoms, phenyl, naphthyl, said aryls which are substituted by 1 to 2 alkyls with 1 to 4 carbon atoms, said aryls which are substituted by 1 to 2 halogen atoms, and said aryls which are substituted by 1 to 2 alkoxy with 1 to 4 carbon atoms; wherein $R_2$ is an alkyl with 1 to 4 carbon atoms; $R_3$, $R_4$ and $R_5$ are members of the group consisting of hydrogen and alkyl with 1 to 4 carbon atoms; $R_6$ is an alkyl with 1 to 10 carbon atoms; and $n$ is an integer of from 1 to 3 inclusive.

2. A compound of the formula

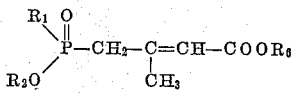

wherein $R_1$ represents phenyl, $R_2$ represents alkyl with 1 to 4 carbon atoms and $R_6$ represents alkyl with 1 to 10 carbon atoms.

3. A compound of the formula

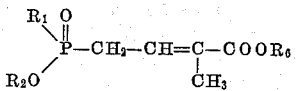

wherein each of $R_1$ and $R_2$ represents alkyl with 1 to 4 carbon atoms and $R_6$ represents alkyl with 1 to 10 carbon atoms.

4. A compound of the formula

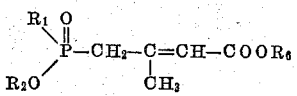

wherein $R_1$ represents alkoxy with 1 to 4 carbon atoms, $R_2$ represents alkyl with 1 to 4 carbon atoms and $R_6$ represents alkyl with 1 to 10 carbon atoms.

5. A compound of the formula

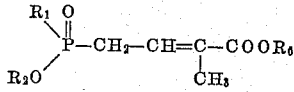

wherein $R_1$ represents alkoxy with 1 to 4 carbon atoms, $R_2$ represents alkyl with 1 to 4 carbon atoms and $R_6$ represents alkyl with 1 to 10 carbon atoms.

6. A compound of the formula

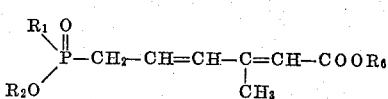

wherein $R_1$ represents alkoxy with 1 to 4 carbon atoms, $R_2$ represents alkyl with 1 to 4 carbon atoms and $R_6$ represents alkyl with 1 to 10 carbon atoms.

7. A compound of the formula

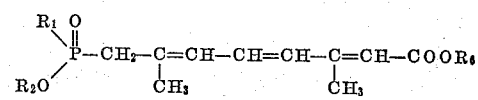

wherein $R_1$ represents alkoxy with 1 to 4 carbon atoms, $R_2$ represents alkyl with 1 to 4 carbon atoms and $R_6$ represents alkyl with 1 to 10 carbon atoms.

References Cited in the file of this patent

UNITED STATES PATENTS

| | | |
|---|---|---|
| 2,559,854 | Dickey et al | July 10, 1951 |
| 2,754,320 | Johnston | July 10, 1956 |

FOREIGN PATENTS

| | | |
|---|---|---|
| 1,237,623 | France | June 20, 1960 |

OTHER REFERENCES

Pudovik et al.: "Bull. Acad. Sci. USSR," 1954.
Coover et al.: "J. Am. Chem. Soc.," vol. 79, No. 8, Apr. 20, 1957, pp. 1963–1965.